(12) United States Patent
David et al.

(10) Patent No.: US 11,467,963 B2
(45) Date of Patent: Oct. 11, 2022

(54) SYSTEM AND METHOD FOR REDUCING REFERENCE COUNT UPDATE CONTENTION IN METADATA BLOCKS

(71) Applicant: EMC IP Holding Company, LLC, Hopkinton, MA (US)

(72) Inventors: Bar David, Rishon Lezion (IL); Bar Harel, Tel Aviv (IL); Dror Zalstein, Givatayim (IL)

(73) Assignee: EMC IP HOLDING COMPANY, LLC, Hopkinton, MA (US)

( * ) Notice: Subject to any disclaimer, the term of this patent is extended or adjusted under 35 U.S.C. 154(b) by 52 days.

(21) Appl. No.: 17/068,281

(22) Filed: Oct. 12, 2020

(65) Prior Publication Data

US 2022/0114100 A1    Apr. 14, 2022

(51) Int. Cl.
*G06F 12/08*    (2016.01)
*G06F 3/06*    (2006.01)
*G06F 12/0815*    (2016.01)

(52) U.S. Cl.
CPC ........ *G06F 12/0815* (2013.01); *G06F 3/0608* (2013.01); *G06F 3/0641* (2013.01); *G06F 2212/154* (2013.01); *G06F 2212/621* (2013.01)

(58) Field of Classification Search
None
See application file for complete search history.

(56) References Cited

U.S. PATENT DOCUMENTS

| 9,223,500 | B1* | 12/2015 | Lemar | G06F 3/0608 |
| 2012/0047115 | A1* | 2/2012 | Subramanya | G06F 16/1727 |
| | | | | 707/696 |
| 2012/0144170 | A1* | 6/2012 | Singh | G06F 11/348 |
| | | | | 712/223 |
| 2012/0290629 | A1* | 11/2012 | Beaverson | G06F 16/137 |
| | | | | 709/224 |
| 2012/0317586 | A1* | 12/2012 | Clevenger | G06F 9/46 |
| | | | | 719/313 |
| 2013/0346707 | A1* | 12/2013 | Voznika | G06F 12/126 |
| | | | | 711/E12.001 |
| 2017/0249246 | A1* | 8/2017 | Bryant | G06F 12/0261 |
| 2018/0081821 | A1* | 3/2018 | Beaverson | G06F 3/0647 |
| 2018/0232304 | A1* | 8/2018 | Wang | G06F 12/0261 |
| 2020/0183890 | A1* | 6/2020 | Wang | G06F 16/1865 |

* cited by examiner

*Primary Examiner* — Kaushikkumar M Patel
(74) *Attorney, Agent, or Firm* — Brian J. Colandreo; Mark H. Whittenberger; Holland & Knight LLP

(57) ABSTRACT

A method, computer program product, and computing system for receiving, at a node of a multi-node storage system, one or more updates to a reference count associated with a metadata block. One or more reference count deltas associated with the metadata block may be stored in a cache memory system of the node. An existing copy of the metadata block in a cache memory system of each other node of the multi-node storage system may be retained.

15 Claims, 7 Drawing Sheets

SYSTEM AND METHOD FOR REDUCING REFERENCE COUNT UPDATE CONTENTION IN METADATA BLOCKS

BACKGROUND

Storing and safeguarding electronic content may be beneficial in modern business and elsewhere. Accordingly, various methodologies may be employed to protect and distribute such electronic content.

Access contention in an active-active multi-node storage system may arise when the same metadata block is accessed from multiple nodes. According to conventional approaches, with any concurrent update to a metadata block where write data is committed, a peer node may be directed to invalidate the node's cache memory system. For example, because the metadata block content was modified by the commit on one node, the cache memory system would hold a stale entry of the metadata block. By invalidating stale entries in the cache memory system of each node, metadata block access contention may be introduced.

Such contention may result in a substantial performance drop while each node's existing metadata blocks are invalidated by changes to another copy of the metadata block in one node. In some implementations, conventional approaches may degrade latency of synchronous flows, like user-data reads and bandwidth for the whole system.

Summary of Disclosure

In one example implementation, a computer-implemented method executed on a computing device may include, but is not limited to, receiving, at a node of a multi-node storage system, one or more updates to a reference count associated with a metadata block. One or more reference count deltas associated with the metadata block may be stored in a cache memory system of the node. An existing copy of the metadata block in a cache memory system of each other node of the multi-node storage system may be retained.

One or more of the following example features may be included. A request to perform an operation on the metadata block that requires a consistent reference count associated with the metadata block may be received from a node of the multi-node storage system, thus defining a requesting node. An exclusive lock on the metadata block may be provided to the requesting node. A request to perform an operation on the metadata block that does not require a consistent reference count associated with the metadata block may be received from at least one node. A shared lock on the metadata block may be provided to the at least one node of the multi-node storage system. The one or more reference count deltas associated with the metadata block may be written to one or more delta container pages of the storage array. It may be determined that writing each of the one or more reference count deltas to the metadata block will exceed a maximum reference count associated with the metadata block. A first portion of the one or more reference count deltas may be written to the metadata block in the storage array based upon, at least in part, the maximum reference count associated with the metadata block. The remaining one or more reference count deltas may be written back to the one or more delta container pages of the storage array.

The reference count associated with the metadata block may be updated, via at least one node, based upon, at least in part, the one or more reference count deltas associated with the metadata block stored in the cache memory system of the at least one node. Updating, via the at least one node, the reference count associated with the metadata block based upon, at least in part, the one or more reference count deltas associated with the metadata block stored in the cache memory system of the at least one node may include caching a copy of the metadata block from a storage array to the cache memory system of the at least one node, and applying the one or more reference count deltas associated with the metadata block stored in the cache memory system of the at least one node to the cached copy of the metadata block. At least a subset of the one or more reference count deltas may be written to the cached copy of the metadata block based upon, at least in part, a maximum reference count associated with the cached copy of the metadata block.

In another example implementation, a computer program product resides on a computer readable medium that has a plurality of instructions stored on it. When executed by a processor, the instructions cause the processor to perform operations that may include, but are not limited to, receiving, at a node of a multi-node storage system, one or more updates to a reference count associated with a metadata block. One or more reference count deltas associated with the metadata block may be stored in a cache memory system of the node. An existing copy of the metadata block in a cache memory system of each other node of the multi-node storage system may be retained.

One or more of the following example features may be included. A request to perform an operation on the metadata block that requires a consistent reference count associated with the metadata block may be received from a node of the multi-node storage system, thus defining a requesting node. An exclusive lock on the metadata block may be provided to the requesting node. A request to perform an operation on the metadata block that does not require a consistent reference count associated with the metadata block may be received from at least one node. A shared lock on the metadata block may be provided to the at least one node of the multi-node storage system. The one or more reference count deltas associated with the metadata block may be written to one or more delta container pages of the storage array. It may be determined that writing each of the one or more reference count deltas to the metadata block will exceed a maximum reference count associated with the metadata block. A first portion of the one or more reference count deltas may be written to the metadata block in the storage array based upon, at least in part, the maximum reference count associated with the metadata block. The remaining one or more reference count deltas may be written back to the one or more delta container pages of the storage array.

The reference count associated with the metadata block may be updated, via at least one node, based upon, at least in part, the one or more reference count deltas associated with the metadata block stored in the cache memory system of the at least one node. Updating, via the at least one node, the reference count associated with the metadata block based upon, at least in part, the one or more reference count deltas associated with the metadata block stored in the cache memory system of the at least one node may include caching a copy of the metadata block from a storage array to the cache memory system of the at least one node, and applying the one or more reference count deltas associated with the metadata block stored in the cache memory system of the at least one node to the cached copy of the metadata block. At least a subset of the one or more reference count deltas may be written to the cached copy of the metadata block based upon, at least in part, a maximum reference count associated with the cached copy of the metadata block.

In another example implementation, a computing system includes at least one processor and at least one memory architecture coupled with the at least one processor, wherein the at least one processor is configured to receive, at a node of a multi-node storage system, one or more updates to a reference count associated with a metadata block. The at least one processor may be further configured to store one or more reference count deltas associated with the metadata block in a cache memory system of the node. The at least one processor may be further configured to retain, in a cache memory system of each other node of the multi-node storage system, an existing copy of the metadata block.

One or more of the following example features may be included. A request to perform an operation on the metadata block that requires a consistent reference count associated with the metadata block may be received from a node of the multi-node storage system, thus defining a requesting node. An exclusive lock on the metadata block may be provided to the requesting node. A request to perform an operation on the metadata block that does not require a consistent reference count associated with the metadata block may be received from at least one node. A shared lock on the metadata block may be provided to the at least one node of the multi-node storage system. The one or more reference count deltas associated with the metadata block may be written to one or more delta container pages of the storage array. It may be determined that writing each of the one or more reference count deltas to the metadata block will exceed a maximum reference count associated with the metadata block. A first portion of the one or more reference count deltas may be written to the metadata block in the storage array based upon, at least in part, the maximum reference count associated with the metadata block. The remaining one or more reference count deltas may be written back to the one or more delta container pages of the storage array.

The reference count associated with the metadata block may be updated, via at least one node, based upon, at least in part, the one or more reference count deltas associated with the metadata block stored in the cache memory system of the at least one node. Updating, via the at least one node, the reference count associated with the metadata block based upon, at least in part, the one or more reference count deltas associated with the metadata block stored in the cache memory system of the at least one node may include caching a copy of the metadata block from a storage array to the cache memory system of the at least one node, and applying the one or more reference count deltas associated with the metadata block stored in the cache memory system of the at least one node to the cached copy of the metadata block. At least a subset of the one or more reference count deltas may be written to the cached copy of the metadata block based upon, at least in part, a maximum reference count associated with the cached copy of the metadata block.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
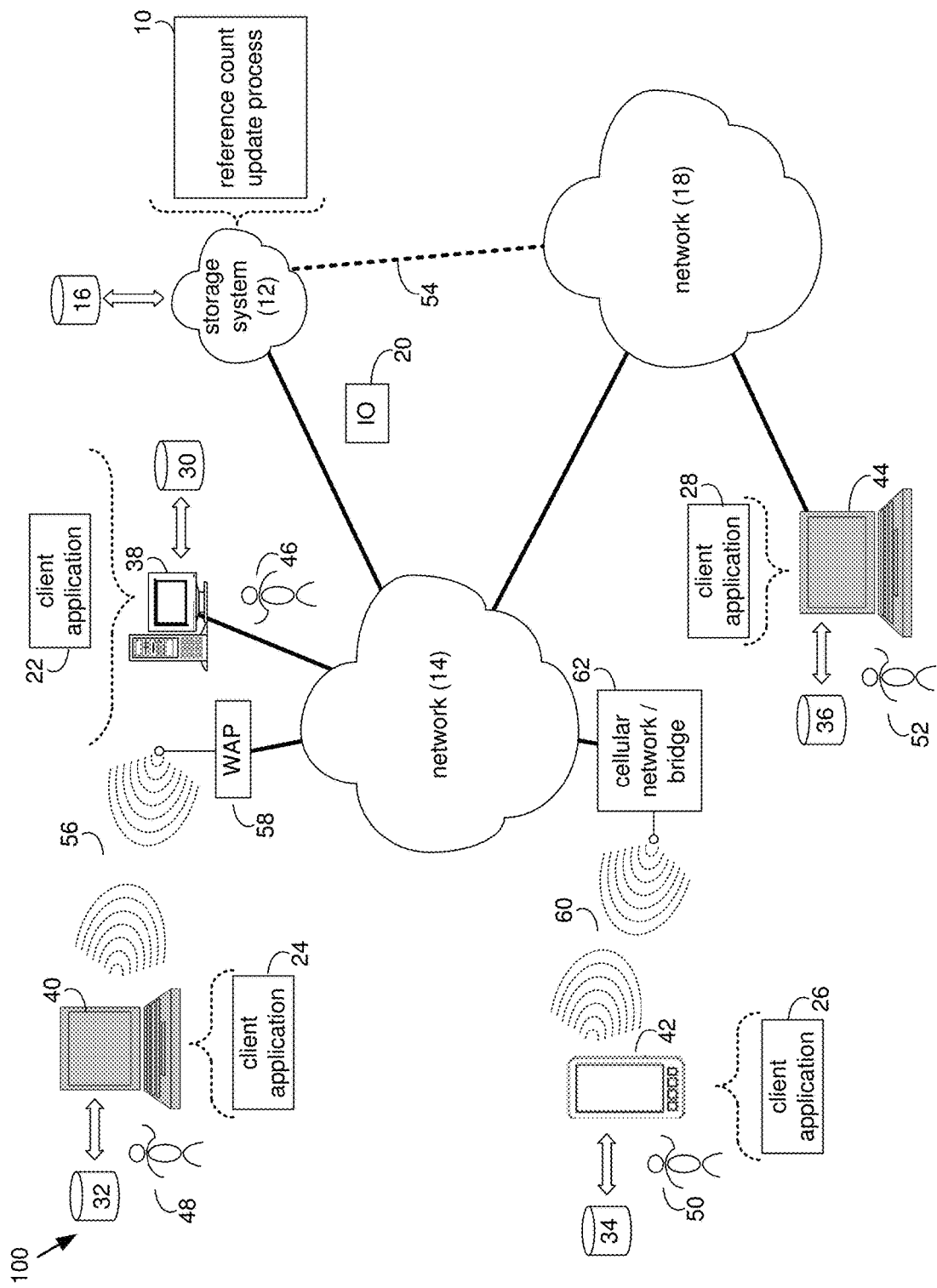
FIG. 1 is an example diagrammatic view of a storage system and a reference count update process coupled to a distributed computing network according to one or more example implementations of the disclosure.

System Overview:

Referring to FIG. 1, there is shown reference count update process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of reference count update process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of reference count update process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RANI); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a reference count update process, such as reference count update process 10 of FIG. 1, may include but is not limited to, receiving, at a node of a multi-node storage system, one or more updates to a reference count associated with a metadata block. One or more reference count deltas associated with the metadata block may be stored in a cache memory system of the node. An existing copy of the metadata block in a cache memory system of each other node of the multi-node storage system may be retained.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
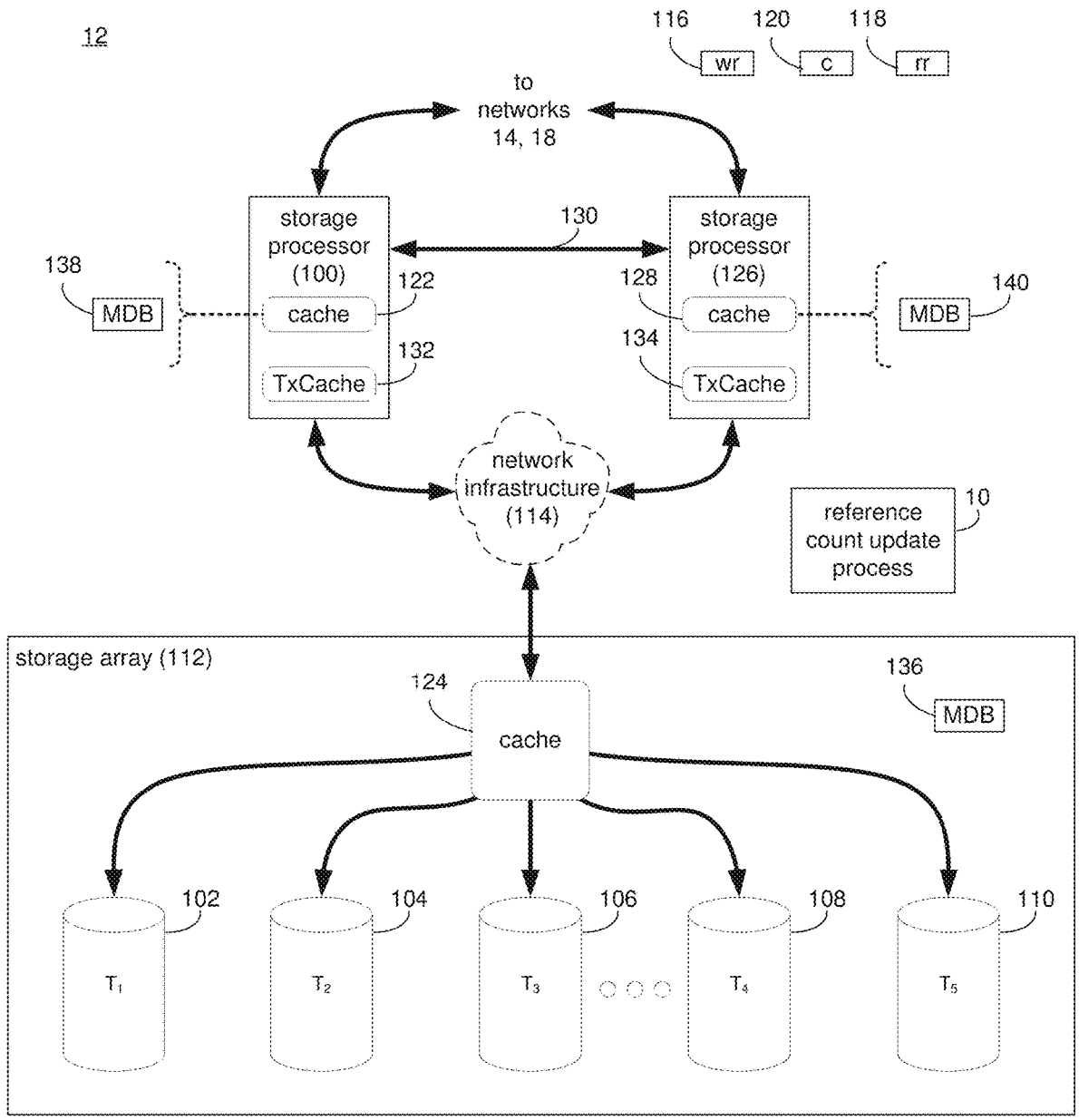
FIGS. 2-3 are example diagrammatic views of the storage system of FIG. 1 according to one or more example implementations of the disclosure.

The Storage System:

Referring also to FIG. 2, storage system 12 may include storage processor 100 and a plurality of storage targets T 1-$n$ (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/ performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/ performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of reference count update process 10. The instruction sets and subroutines of reference count update process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of reference count update process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of TO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of reference count update process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of reference count update process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

In some implementations, storage system 12 may include multi-node active/active storage clusters configured to provide high availability to a user. As is known in the art, the term "high availability" may generally refer to systems or components that are durable and likely to operate continuously without failure for a long time. For example, an active/active storage cluster may be made up of at least two nodes (e.g., storage processors 100, 126), both actively running the same kind of service(s) simultaneously. One purpose of an active-active cluster may be to achieve load balancing. Load balancing may distribute workloads across all nodes in order to prevent any single node from getting overloaded. Because there are more nodes available to serve, there will also be a marked improvement in throughput and response times. Another purpose of an active-active cluster may be to provide at least one active node in the event that one of the nodes in the active-active cluster fails.

In some implementations, storage processor 126 may function like storage processor 100. For example, during operation of storage processor 126, content 118 to be written to storage system 12 may be processed by storage processor 126. Additionally/alternatively and when storage processor 126 is configured as an application server, content 118 to be written to storage system 12 may be internally generated by storage processor 126.

Storage processor 126 may include frontend cache memory system 128. Examples of frontend cache memory system 128 may include but are not limited to a volatile, solid-state, cache memory system (e.g., a dynamic RAM cache memory system) and/or a non-volatile, solid-state, cache memory system (e.g., a flash-based, cache memory system).

Storage processor 126 may initially store content 118 within frontend cache memory system 126. Depending upon the manner in which frontend cache memory system 128 is configured, storage processor 126 may immediately write content 118 to data array 112 (if frontend cache memory system 128 is configured as a write-through cache) or may subsequently write content 118 to data array 112 (if frontend cache memory system 128 is configured as a write-back cache).

In some implementations, the instruction sets and subroutines of node fencing process 10, which may be stored on storage device 16 included within storage system 12, may be executed by one or more processors (not shown) and one or more memory architectures (not shown) included within storage system 12. Accordingly, in addition to being executed on storage processor 126, some or all of the instruction sets and subroutines of node fencing 10 may be executed by one or more processors (not shown) and one or more memory architectures (not shown) included within data array 112.

Further and as discussed above, during the operation of data array 112, content (e.g., content 118) to be written to data array 112 may be received from storage processor 126 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

As discussed above, storage processor 100 and storage processor 126 may be configured in an active/active configuration where processing of data by one storage processor may be synchronized to the other storage processor. For example, data may be synchronized between each storage processor via a separate link or connection (e.g., connection 130).

Metadata Architecture:

In the context of storage systems, metadata may generally include useful internal information managed by a storage array to describe and locate user data. All modern arrays abstract the physical media and present logical (virtualized) addresses to clients in the form of LUNs. The mapping between the logical address and physical address is a form of metadata that the array needs to manage. That's typically the most common form of metadata for SAN storage systems. Newer architectures manage additional metadata to implement additional capabilities. For example, snapshots, change tracking for efficient remote replication, deduplication pointers, and compression all involve managing some form of metadata.

The classic metadata structure of traditional storage systems directly links a Logical Address of a Block to the Physical Location of the Block. In this metadata structure, every logical block written, has a physical block linked directly to it. In addition, as most traditional storage systems were architected for a spinning disk storage medium optimized for sequential writes the address of the logical address affects the physical location that the data is stored. This can lead to an unbalanced storage array that can suffer from hot-spots as specific address space ranges may experience more performance/IOPs than other address space ranges.

Embodiments of the present disclosure may support a flash/random access medium. For example, embodiments of the present disclosure may include a metadata structure that completely decouples the Logical Block Address space address from the physical one. This is done by leveraging a multi-layer architecture.

Figure 3:
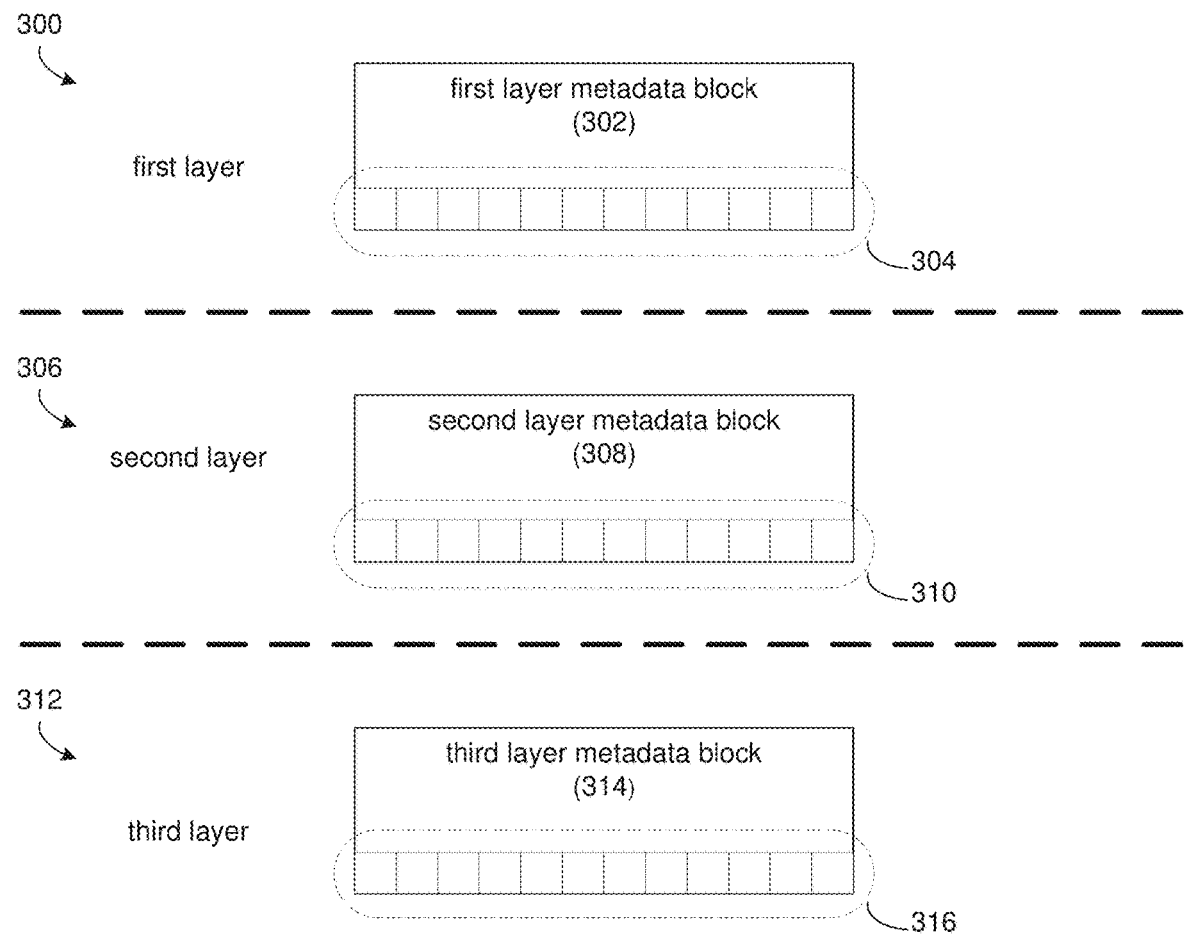
Figure 4:
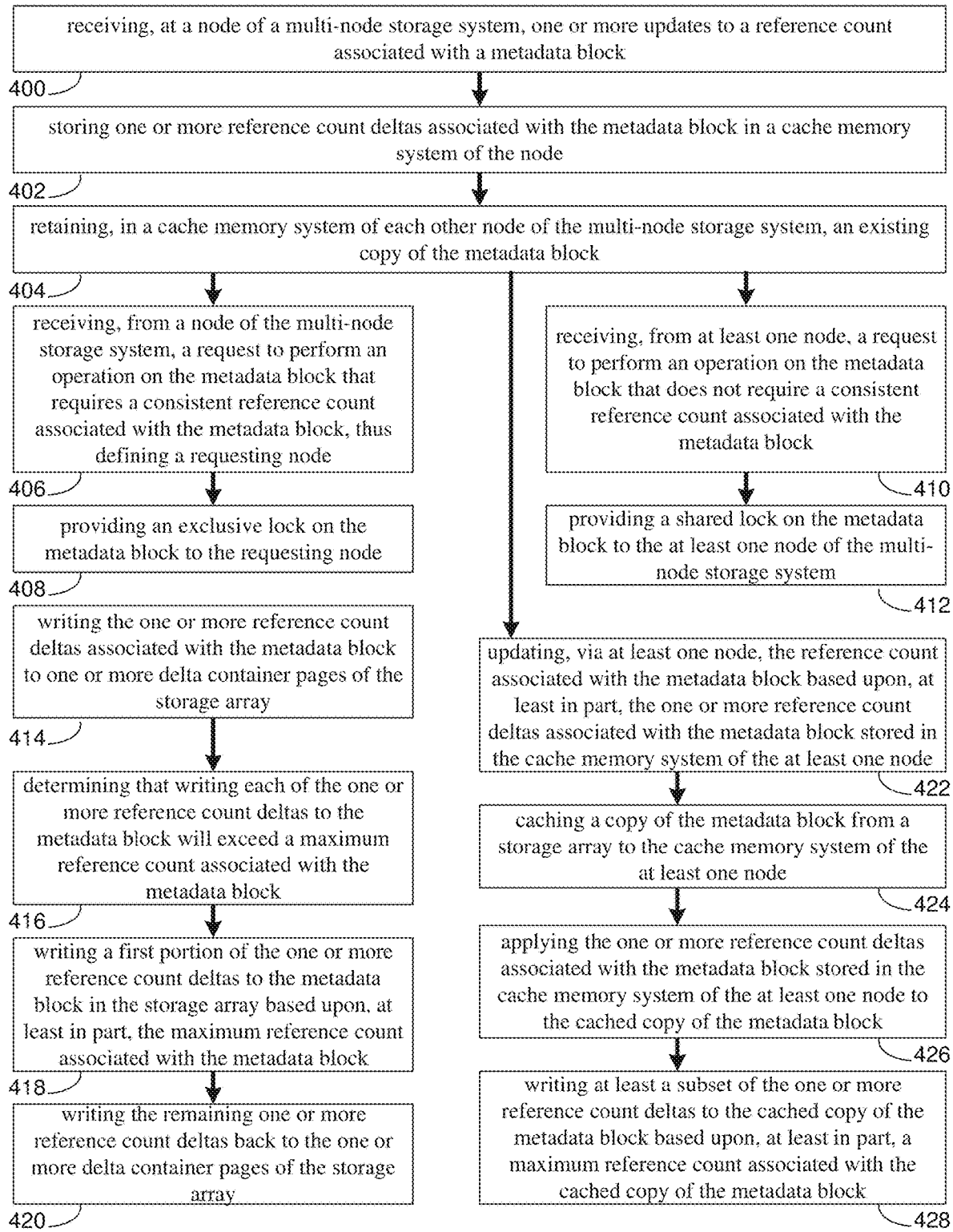
FIG. 4 is an example flowchart of the reference count update process of FIG. 1 according to one or more example implementations of the disclosure.

Referring also to FIG. 3, a storage system may generally include three layers of metadata blocks. While the following example includes metadata "blocks", it will be appreciated that other units of data storage may be used within the scope of the present disclosure. In some implementations, a first layer (e.g., first layer 300) may include first layer metadata blocks (e.g., first layer metadata block 302) with a plurality of entries (e.g., plurality of entries 304) that map or point to a plurality of entries of one or more second layer metadata blocks. The first layer may (e.g., first layer 300) represent various ranges of Logical Block Addresses (LBAs). For example, each entry of the plurality of entries (e.g., plurality of entries 304) of the first layer metadata blocks (e.g., first layer metadata block 302) may be associated with a LBA range. In some implementations, the first layer (e.g., first layer 300) may be organized in a "tree" data structure where each "leaf" of the "tree" data structure corresponds to a specific LBA range. Accordingly, each first layer metadata block (e.g., first layer metadata block 302) may hold mapping of a LBA to a second layer metadata block. It will be appreciated that other data structures may be used within the scope of the present disclosure to organize the first layer.

In some implementations, a second layer (e.g., second layer 306) may include second layer metadata blocks (e.g., second layer metadata block 308) with a plurality of entries (e.g., plurality of entries 310) that map to a plurality of entries of one or more third layer metadata blocks. The second layer (e.g., second layer 306) may generally isolate the logical address of a block from the physical location of the block. For example, a second layer metadata block (e.g., second layer metadata block 308) may encapsulate the physical location of user data and allow relocation without updating first layer metadata blocks (e.g., first layer metadata block 302). Accordingly, the second layer (e.g., second layer 306) may decouple the Logical Block Address space address from the physical one. As will be discussed in greater detail below, second layer metadata blocks (e.g., second layer metadata block 308) may be stored in a storage array (e.g., on one of storage targets 102, 104, 106, 108 of storage array 112).

In some implementations, a third layer (e.g., third layer 312) may include third layer metadata blocks (e.g., third layer metadata block 314) with a plurality of entries or portions (e.g., plurality of entries 316) that are configured to store user data. In this manner, the third layer (e.g., third layer 312) may describe the physical location of user data in a storage system. In some implementations, each third layer metadata block (e.g., third layer metadata block 314) may have a predefined amount of storage capacity for storing metadata (e.g., user data). As will be discussed in greater detail below, third layer metadata blocks (e.g., third layer metadata block 314) may be stored in a storage array (e.g., on one of storage targets 102, 104, 106, 108 of storage array 112).

The Reference Count Update Process:

Referring also to FIGS. 4-7 and in some implementations, reference count update process 10 may receive 400, at a node of a multi-node storage system, one or more updates to a reference count associated with a metadata block. One or more reference count deltas associated with the metadata block may be stored 402 in a cache memory system of the node. An existing copy of the metadata block in a cache memory system of each other node of the multi-node storage system may be retained 404.

In some implementations, reference count update process 10 may allow various operations to be performed on metadata blocks (e.g., second layer metadata block 308) in a storage system. For example, operations that may be performed on the metadata blocks (e.g., metadata block (MDB)

136) may generally include writing new blocks of user data to a storage array, performing deduplication on existing data, removing data, garbage collection operations, etc. In some implementations, each node (e.g., storage processor 100, 126) may include a component or module configured to manage or handle these operations (e.g., TxCache component 132, 134). In some implementations, each TxCache component (e.g., TxCache component 132, 134) may be configured (e.g., by reference count update process 10) to manage locks on metadata blocks, provide transactional protection for composite updates requiring multiple page writes atomically, provide a least recently used (LRU) cache for pages in order to avoid excessive reading of the metadata blocks from the storage array, and LRU cache invalidation (e.g., invalidation of an existing metadata block on one node in response to updating the metadata block on another node).

In some implementations, each TxCache component (e.g., TxCache component 132, 134) may be configured to operate in an active-active manner (i.e., same metadata pages/metadata blocks may be accessed and modified from both nodes). In some implementations and in order to provide data integrity and correctness, TxCache component 132, 134 may use transactional persistent memory on non-volatile random access memory (NVRAM) storage within each node. This may serialize all the transaction content to NVRAM storage prior to final commit. In some implementations, TxCache component 132, 234 may manage a cache memory system (e.g., a LRU cache) for metadata pages/blocks. This may improve the access times to hot sections.

As will be discussed in greater detail below, access contention in an active-active multi-node storage system may arise when the same metadata block is accessed from multiple nodes. Moreover, this behavior is highly probable when data is shared between multiple volumes assigned to different nodes. For example, an operation (e.g., a deduplication operation) may hit the same metadata blocks from different instances of TxCache (e.g., TxCache component 132, 134).

According to conventional approaches, with any concurrent update to a metadata block where write data is committed, the TxCache component may send the update to its peer node to invalidate the peer node's cache memory system (e.g., LRU cache). For example, because the metadata block content was modified by the commit on one node, the cache memory system would hold a stale entry of the metadata block. By invalidating stale entries in the cache memory system of each other node, metadata block access contention may be introduced.

Referring again to the example of FIG. 2 and in some implementations, if a first node (e.g., storage processor 100) updates a copy of a metadata block (e.g., metadata block (MDB) 138, where metadata block 138 is a cached copy of metadata block 136) stored in the cache memory system of the first node (e.g., cache memory system 122). According to conventional approaches, TxCache component 132 would invalidate any existing copies of the updated metadata block in other nodes (e.g., metadata block (MDB) 140 stored in cache memory system 128 of storage processor 126, where metadata block 140 is a cached copy of metadata block 136). Suppose a second node (e.g., storage processor 126) receives a request to perform an operation on the metadata block that was invalidated from its cache memory system (e.g., metadata block 138). The request may result in a cache miss and the whole metadata block may be read from the storage array (e.g., storage array 112).

Such contention may result in a substantial performance drop while each node's existing metadata blocks are invalidated by changes to another copy of the metadata block in one node. In some implementations, conventional approaches may degrade latency of synchronous flows, like user-data reads and bandwidth for the whole storage system.

As will be discussed in greater detail below, embodiments of the present disclosure may store reference count increases using shared-access locking on the metadata blocks while ensuring consistency of the reference count, therefore increasing performance while preventing storage leaks.

In some implementations, reference count update process 10 may receive 400, at a node of a multi-node storage system, one or more updates to a reference count associated with a metadata block. As discussed above and in some implementations, a metadata block may generally include a reference to a physical location of user data within a storage array. Referring again to the example of FIG. 3 and in some implementations, a metadata block (e.g., second layer metadata block 308) may encapsulate the physical location of user data and allow relocation without updating first layer metadata blocks (e.g., first layer metadata block 302). In some implementations, a reference count associated with a metadata block may generally include a count of the number of first layer metadata blocks (e.g., first layer metadata block 302) that point or reference that second layer metadata block (e.g., second layer metadata block 308). Accordingly, the terms "metadata block", "metadata page", and "second layer metadata block" may be used interchangeably throughout the present disclosure.

Referring again to the example of FIG. 2, suppose a node (e.g., storage processor 100) receives 400 one or more updates to a reference count associated with a metadata block (e.g., metadata block 136). As discussed above, metadata blocks may be stored in a storage array (e.g., storage array 112) and cached copies of the metadata blocks may be temporarily stored in cache memory systems of nodes coupled to the storage array (e.g., metadata block 138 in cache memory system 122 of storage processor 100 and metadata block 140 in cache memory system 128 of storage processor 126, where each of metadata blocks 138, 140 are cached copies of metadata block 136). While the example of FIG. 2 shows a cached copy of metadata block 136 in both cache memory systems 122, 128 of storage processors 100, 126, it will be appreciated that each storage processor may or may not have a cached copy of a metadata block within its cache memory system at a given time. For example, suppose metadata block 138 is invalidated. In this example, storage processor 100 would need to re-cache a copy of metadata block 136 from storage array 112 into cache memory system 122.

In some implementations, updates to a reference count associated with a metadata block may include increases to the number of reference counts associated with the metadata block. For example, a deduplication operation may generally increase the reference count of a particular metadata block as references from first layer metadata blocks to other second layer metadata blocks are re-referenced to another second layer metadata block. In the example of FIG. 2, reference count update process 10 may receive 400, at a node (e.g., storage processor 100) one or more updates to the reference count associated with metadata block 136 that increase the reference count associated with metadata block 136.

In some implementations, reference count update process 10 may store 402 one or more reference count deltas associated with the metadata block in a cache memory system of the node. For example and as discussed above, the one or more updates to the reference count associated with a metadata block may include one or more reference count increases and/or decreases. In some implementations, reference count update process 10 may store 402 the one or more reference count updates as one or more reference count deltas or changes in a cache memory system. A reference count delta may generally include a delta or change value in a reference count associated with a metadata block (e.g., a delta indicative of one or more additional first layer metadata blocks referencing the second layer metadata block and/or a delta indicative of one or more fewer first layer metadata blocks referencing the second layer metadata block).

In some implementations, reference count update process 10 may store the one or more reference count deltas in a data container associated with a specific metadata block. In some implementations, a data container may generally include a data structure for storing one or more reference count changes or reference count deltas. Each data container or bucket of the one or more data containers or buckets may be associated with a particular metadata block. For example and as will be discussed in greater detail below, each data container may store one or more reference count changes or deltas associated with a particular metadata page or block. The one or more data containers may be stored in volatile memory. Volatile memory may generally include any temporary memory of a storage system. In one example, the memory may include Random Access Memory (RAM) based storage within a storage processor/node (e.g., cache memory system 122). RAM-based memory system may include non-persistent RAM-based storage. As is known in the art, non-persistent RAM-based storage is RAM-based storage that will lose its data in the event of e.g., a power failure. However, it will be appreciated that other forms or types of volatile memory may be used within the scope of the present disclosure.

In some implementations, reference count update process 10 may receive one or more reference count updates associated with a metadata block. As discussed above, a storage processor (e.g., storage processor 100) may receive an operation that may specify a change to a reference count associated with a metadata block within the storage array (e.g., data array 112). Accordingly, the one or more reference count updates may specify changes to a reference count associated with a metadata block in the storage array.

Figure 5:
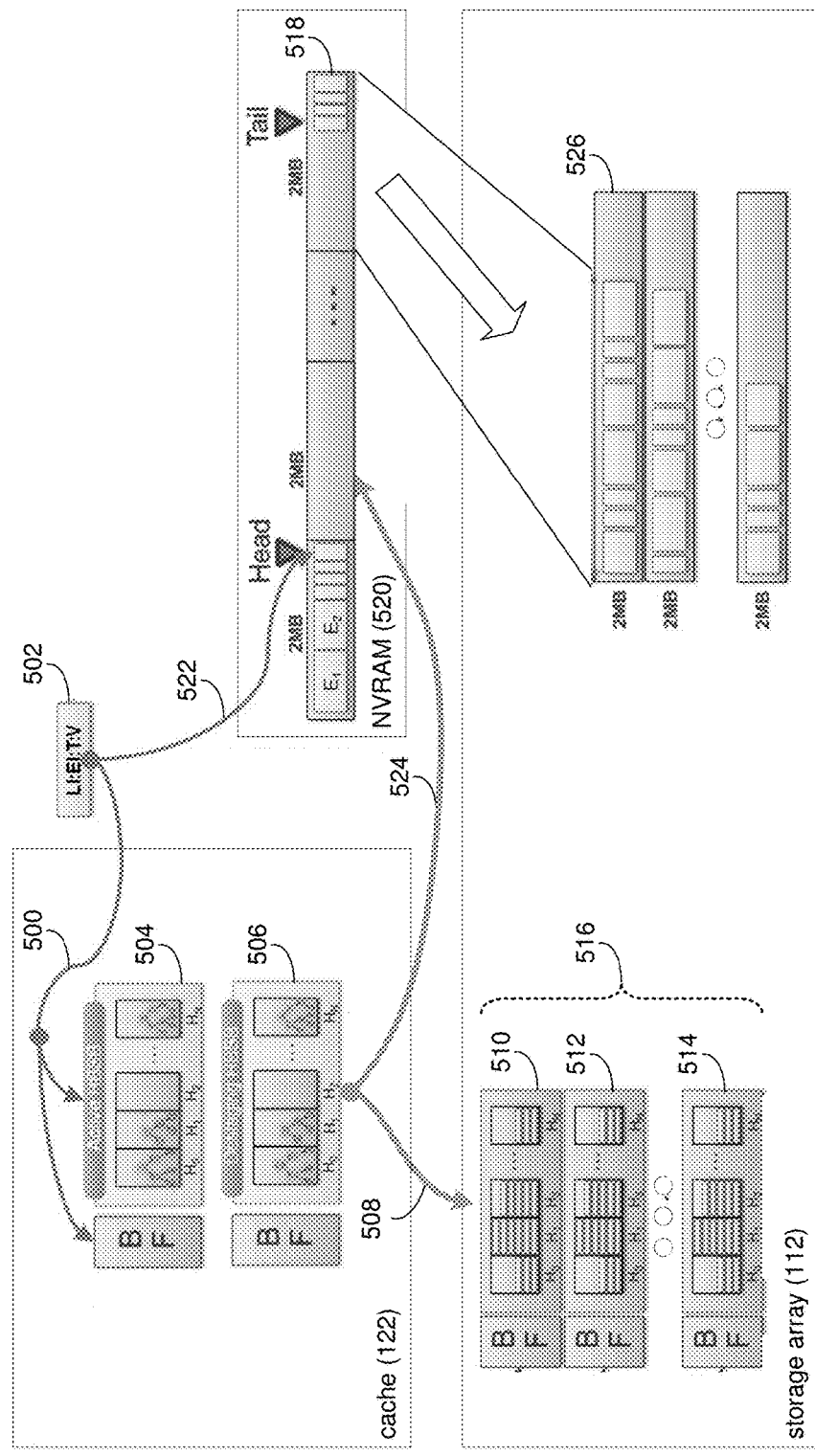
FIGS. 5-7 are example diagrammatic views of the reference count update process of FIG. 1 according to one or more example implementations of the disclosure.

Referring also to FIG. 5 and in some implementations, reference count update process 10 may route (represented by arrow 500) each reference count delta (e.g., reference count delta 502) to a specific data container or bucket of the one or more data containers (e.g., one or more data containers 504, 506). In some implementations, each data container of the one or more data containers (e.g., one or more data containers 504, 506) may be organized as a binary tree of reference count deltas. For example, upon writing the reference count delta to a specific data container, reference count update process 10 may sort the reference count deltas based upon, at least in part, an insertion order. In other words, each reference count delta may be sorted in the binary tree structure within the data container based on when the reference count delta was received. While a binary tree structure has been described, it will be appreciated that various sorting algorithms or data structures may be used within the scope of the present disclosure.

Referring again to FIGS. 2 and 5 and returning to the above example where storage processor 100 receives 400 one or more updates for a reference count associated with metadata block 136, reference count update process 10 may store 402 one or more reference count deltas (e.g., reference count delta 502) in cache memory system 122. Specifically, reference count update process 10 may store 402 the one or more reference count deltas (e.g., reference count delta 502) in one or more data storage containers (e.g., one or more data storage containers 504, 506). In one example, reference count update process 10 may store 402 the one or more reference count deltas (e.g., reference count delta 502) in a data storage container associated with metadata block 136.

In some implementations, reference count update process 10 may retain 404, in a cache memory system of each other node of the multi-node storage system, an existing copy of the metadata block. As discussed above, while updates to a reference count associated with a metadata block may normally result in any existing copies of the metadata block stored in other cache memory systems being stale, changes to a reference count associated with the metadata block may not render copies of the metadata block out-of-date for all operations on the metadata block as many operations do not require a consistent reference count. As will be discussed in greater detail below, because only certain operations require a consistent reference count associated with a metadata block, reference count update process 10 may retain 404 (i.e., preserve without deleting) other existing copies of the metadata block in the cache memory system of each other node in the multi-node storage system.

Referring again to FIG. 2 and returning to the above example where storage processor 100 receives 400 one or more updates for a reference count associated with metadata block 136 and stores 402 one or more reference count deltas to cache memory system 122 of storage processor 100, reference count update process 10 may retain 404, in the cache memory system of each other node, any existing copy of the metadata block. For example, suppose metadata block 140 stored in cache memory system 128 of storage processor 126 is a cached copy of metadata block 136. In some implementations, because the one or more updates for the reference count associated with the metadata block 136 may not render other existing copies of the metadata block stored in other cache memory systems of other nodes stale or out-of-date. In this example, reference count update process 10 may retain 404 metadata block 140 in cache memory system 128 of storage processor 126 because metadata block 140 may be used for various operations that do not require a consistent reference count associated with the metadata block. Accordingly, the existing copy of the metadata block (e.g., metadata block 140) may be used to process various requests from the cache memory system of a node (e.g., cache memory system 128 of storage processor 126), thus avoiding performance drops associated with a cache miss and reading the metadata block from the storage array.

In some implementations, reference count update process 10 may receive 406, from a node of the multi-node storage system, a request to perform an operation on the metadata block that requires a consistent reference count associated with the metadata block, thus defining a requesting node. As discussed above, various operations on a metadata block may require a consistent reference count associated with the metadata block. A consistent reference count associated with a metadata block may generally include a complete, up-to-date reference count associated with a metadata block across the storage system. For example, a consistent reference count may include the reference count associated with a metadata block including any changes or updates made to the reference count associated with any copy of the metadata block.

One example of an operation that requires a consistent reference count is a garbage collection operation. For example and as shown above in FIG. 3, a garbage collection operation cannot reclaim data of a third layer metadata block pointed to by a second layer metadata block unless the reference count associated with that second layer metadata block is zero (i.e., indicative of user data that is not being referenced within a storage array). In this manner, an unreferenced third layer metadata block may be reclaimed for new user data. While an example of a garbage collection operation has been provided for operations that require a consistent reference count associated with a metadata block, it will be appreciated that other operations may require a consistent reference count within the scope of the present disclosure.

In some implementations, reference count update process 10 may provide 408 an exclusive lock on the metadata block to the requesting node. An exclusive lock may generally include a temporary restriction on the ability to access and modify a metadata block to all nodes except a requesting node. For example, a requesting node may be provided 408 with an exclusive lock on the metadata block for performing an operation that requires a consistent reference count to prevent other nodes from accessing and modifying the reference count (or any other data) associated with the metadata block. In some implementations, reference count update process 10 may provide 408 the exclusive lock to the requesting node for the duration of the operation. For example, upon completing the operation, the requesting node may release the exclusive lock.

Referring again to the example of FIG. 2, suppose reference count update process 10 receives 406 a request to perform an operation that requires a consistent reference count associated with metadata block 136 (e.g., a garbage collection operation). In some implementations, reference count update process 10 may provide 408 an exclusive lock on metadata block 136 by invalidating any existing copies of metadata block 136 from the cache memory system of each other node. In this example, reference count update process 10 may invalidate metadata block 140 from cache memory system 128 of storage processor 126. Additionally, reference count update process 10 may prevent any other node (e.g., storage processor 126) from accessing and modifying metadata block 136 within the storage array while the requesting node (e.g., storage processor 100) performs the operation that requires a consistent reference count associated with metadata block 136. Upon completion of the operation, the requesting node (e.g., storage processor 100) may release the exclusive lock and reference count update process 10 may allow other nodes to access metadata block 136 within the storage array.

In some implementations, reference count update process 10 may receive 410, from at least one node, a request to perform an operation on the metadata block that does not require a consistent reference count associated with the metadata block. As discussed above, some operations require a consistent reference count associated with a metadata block. However, some operations may only read the reference count and/or do not rely on the reference count associated with a metadata block.

One example of an operation that does not require a consistent reference count is a deduplication operation. For example, a deduplication operation may read the metadata block but generally does not require the latest reference count to perform deduplication. While an example of a deduplication operation has been provided for operations that do not require a consistent reference count associated with a metadata block, it will be appreciated that other operations may not require a consistent reference count within the scope of the present disclosure. For example, any operation that decreases the reference count may require a consistent reference count. For example, when a reference count reaches zero, the associated block that it is referencing will be released. A consistent reference count may be required in this case to avoid data corruption.

In some implementations, reference count update process 10 may provide 412 a shared lock on the metadata block to the at least one node of the multi-node storage system. A shared lock on the metadata block may generally include one or more co-existing restrictions on a metadata block that permit certain types of operations that access the metadata block without changing or modifying the metadata block (e.g., reading data, deduplication data, etc.) and prohibit other types of operations that change or modify the metadata block. In some implementations, reference count update process 10 may provide 412 the shared lock to at least one node for the duration of the operation.

Referring again to the example of FIG. 2, suppose reference count update process 10 receives 410 a request to perform an operation that does not require a consistent reference count associated with metadata block 136 (e.g., a deduplication operation). In some implementations, reference count update process 10 may provide 412 a shared lock on metadata block 136. In this example, reference count update process 10 may retain metadata block 140 stored within cache memory system 128 of storage processor 126. Additionally, reference count update process 10 may allow another node (e.g., storage processor 126) to perform another operation on metadata block 136 within the storage array that does not require a consistent reference count while the requesting node (e.g., storage processor 100) performs the operation that does not require a consistent reference count associated with metadata block 136. In some implementations, when any node has been provided with a shared lock, reference count update process 10 may prevent any other node from modifying or changing data associated with metadata block 136. Upon completion of their respective operations, each node (e.g., storage processors 100, 126) may release the shared lock.

In some implementations, reference count update process 10 may write 414 the one or more reference count deltas associated with the metadata block to one or more delta container pages of the storage array. Referring again to the example of FIG. 5 and in some implementations, reference count update process 10 may receive 400, at a node, one or more updates for a reference count associated with a metadata block and may store 402 one or more reference count deltas to a cache memory system of the node. In some implementations, the one or more reference count deltas (e.g., reference count delta 502) may be stored in one or more data containers (e.g., one or more data containers 504, 506) in the cache memory system (e.g., cache memory system 122) of the node (e.g., storage processor 100). In some implementations, reference count update process 10 may destage the one or more reference count deltas to the storage array (e.g., storage array 112).

In some implementations, writing 414 the one or more reference count deltas stored in the cache memory system to the storage array may include writing the one or more reference count deltas stored in each data container to a separate delta container page of a set of delta container pages in the storage array, wherein each delta container page is associated with a metadata block. For example and referring again to the example of FIG. 5, reference count update process 10 may write (represented with arrow 508) the one or more reference count deltas from the one or more data containers (e.g., one or more data containers 504, 506) to the storage array (e.g., data array 112) by writing 414 the one or more reference count deltas stored in each data container to a separate delta container page of a set of delta container pages (e.g., set of delta container pages 510, 512, 514). In this manner, the one or more reference count deltas from each data container of the one or more data containers may be written 414 to a corresponding delta container page of a set of delta container pages (e.g., set of delta container pages 510, 512, 514). Accordingly, a particular set of delta container pages (e.g., set of delta container pages 510, 512, 514) may store the one or more reference count deltas of a particular set of data containers (e.g., one or more data containers 504, 506).

As discussed above and in some implementations, each delta container page or "bucket page" may have a pre-defined size of a metadata block (e.g., 4 KB). Similar to the set of data containers stored in volatile memory, each set of delta container pages or "tablet" may have a delta container page associated with a respective metadata block. In some implementations, a delta container page may sort the one or more metadata changes for a particular metadata block by insertion time. In some implementations, a set of active tablets or multiple sets of delta container pages (e.g., set of delta container pages 510, 512, 514) may be organized in a storage array (e.g., storage array 112) as a ring buffer (e.g., ring buffer 516). For example, a set of delta container pages or a tablet may be added to a "head" of the ring buffer (e.g., ring buffer 516) and released or deleted from a "tail" of the ring buffer. The process of releasing or deleting a set of delta container pages will be described in greater detail below.

In some implementations, reference count update process 10 may write the one or more reference count deltas to a metadata log in non-volatile memory. Referring again to the example of FIG. 5 and in some implementations, reference count update process 10 may generate a metadata log (e.g., metadata log 518) in non-volatile memory (e.g., non-volatile Random Access Memory (NVRAM) 520). In some implementations, the metadata log may store (indicated by arrow 522) reference count deltas in time order (e.g., sorted oldest to newest). In some implementations, the contents (e.g., reference count delta 502) of the may preserved in the event of a power failure or other failure of the cache memory system. In some implementations and in response to the failure of the cache memory system, reference count update process 10 may recover the one or more reference count deltas from the metadata log (e.g., metadata log 518).

In some implementations and in response to destaging or writing the one or more reference count deltas from the one or more data containers (e.g., one or more data containers 504, 506) to the storage array (e.g., to a set of delta container pages 510, 512, 514), reference count update process 10 may release or free (indicated by arrow 524) the corresponding part of the metadata log (e.g., metadata log 518). In some implementations, reference count update process 10 may determine that the metadata log (e.g., metadata log 518) is full and may write at least a portion of the one or more reference count deltas stored in the metadata log to the storage array (e.g., data array 112). In some implementations, the at least a portion of the one or more reference count deltas written to the storage array may be stored as e.g., 2 MB chunks (e.g., data chunk 526) in the storage array (e.g., storage array 112). While a 2 MB chunk has been discussed, it will be appreciated that the at least a portion of the one or more reference count deltas may be stored in various chunks or blocks of varying sizes.

In some implementations, reference count update process 10 may aggregate the one or more reference count deltas and write the one or more reference count deltas to the metadata block. For example, reference count update process 10 may combine a plurality of delta container pages associated with a metadata block from a plurality of sets of delta container pages in the storage array, thus defining a data container working set.

Figure 6:
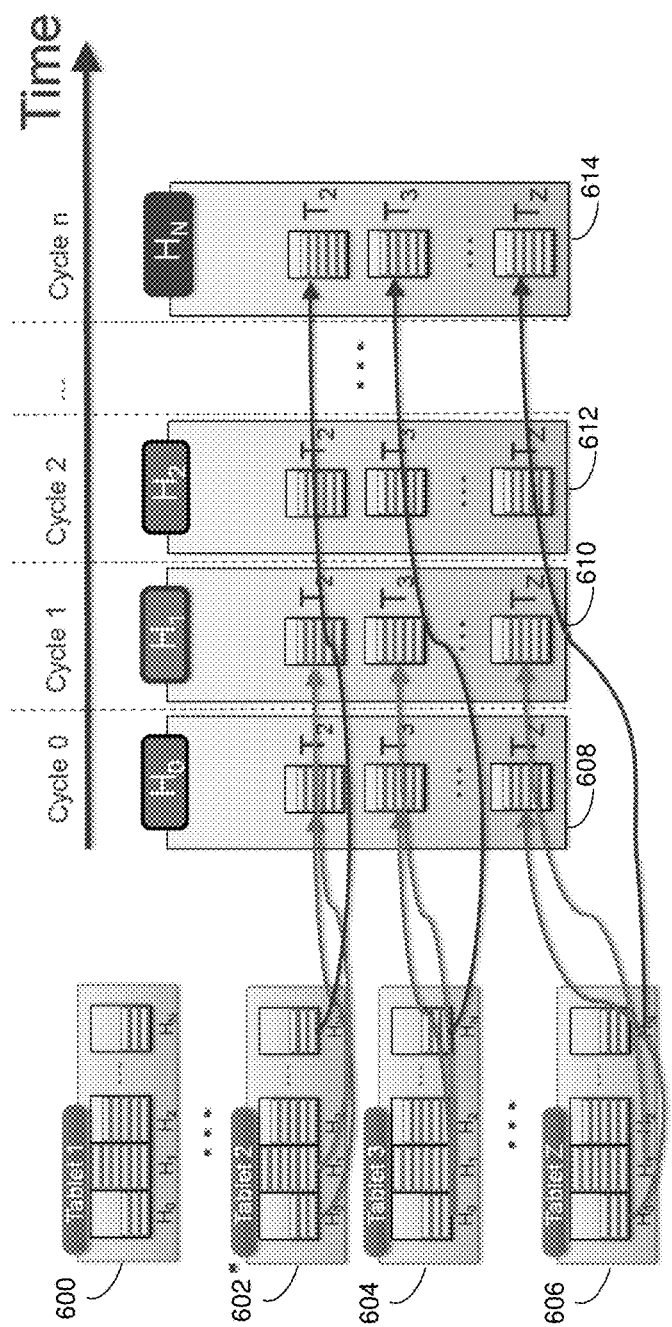
Figure 7:
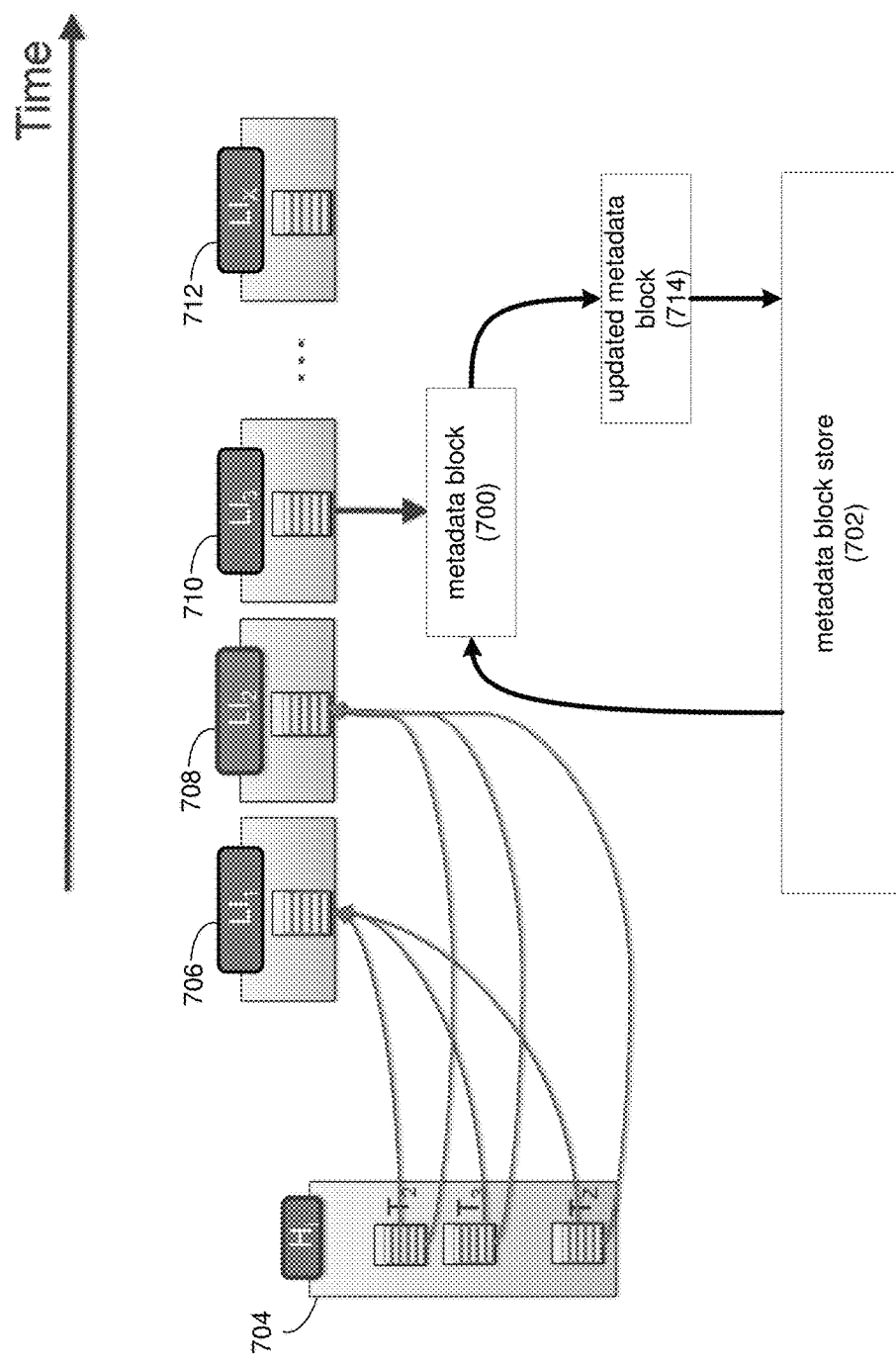

Referring also to the example of FIG. 6, reference count update process 10 may combine a delta container page associated with a particular metadata block from a plurality of sets of delta container pages (e.g., set of delta container pages 600, 602, 604, 606), thus defining a data container working set (e.g., data container working sets 608, 610, 612, 614). As shown in the example of FIG. 6, four sets of delta container pages may include delta container pages associated with (in this example) four metadata blocks. Accordingly, reference count update process 10 may combine 428 the delta container pages from each of the sets of delta container pages (e.g., set of delta container pages 600, 602, 604, 606) for each metadata block to define a data container working set or bucket working set for each metadata block (e.g., data container working sets 608, 610, 612, 614). In some implementations, reference count update process 10 may generate one data container working set per cycle. While a single data container working set per cycle has been described, it will be appreciated that any number of data container working sets may be generated per any number of cycles.

In some implementations, reference count update process 10 may determine 416 that writing each of the one or more reference count deltas to the metadata block will exceed a maximum reference count associated with the metadata block. For example, a metadata block may have a predefined maximum reference count (i.e., a maximum number of first layer metadata blocks referencing the second layer metadata block). In some implementations, reference count update process 10 may determine 416 that writing the one or more reference count deltas to a particular metadata block will exceed the maximum reference count associated with the metadata block. In some implementations, reference count update process 10 may determine that the reference count will overflow the maximum reference count associated with the metadata block.

In some implementations, reference count update process 10 may write 418 a first portion of the one or more reference count deltas to the metadata block in the storage array based upon, at least in part, the maximum reference count associated with the metadata block. In some implementations, reference count update process 10 may determine how many reference count deltas may be written 418 to the metadata block. In this manner, reference count update process 10 may determine a first portion of the one or more reference count deltas to write to the metadata block. Referring also to the example of FIG. 7 and in some implementations, reference count update process 10 may read the metadata block from the storage array. In some implementations, the metadata block (e.g., metadata block 700) may be read from a metadata block store (e.g., metadata block store 702) on the storage array (data array 112).

In some implementations, reference count update process 10 may merge the one or more reference count deltas from the data container working set and the metadata block read from the storage array, thus defining an updated metadata block. Referring to the example of FIG. 7 and in some implementations, reference count update process 10 may sort the first portion of the one or more reference count deltas from a plurality of data container working sets (e.g., data container working set 704) by time, thus defining an aggregated list of reference count deltas (e.g., aggregated lists 706, 708, 710, 712) for each metadata block. In response to sorting the one or more reference count deltas from the data container working sets to define the aggregated list, reference count update process 10 may merge 432 the aggregated list (e.g., aggregated list 710) and the metadata block read from the storage array (e.g., metadata block 700) to generate an updated metadata block (e.g., updated metadata block 714). In some implementations, reference count update process 10 may write the updated metadata block to the storage array (including the first portion of the one or more reference count deltas).

In some implementations, reference count update process 10 may write 420 the remaining one or more reference count deltas back to the one or more delta container pages of the storage array. In some implementations and referring again to the example of FIG. 5, reference count update process 10 may, in response to writing the first portion of the one or more reference count deltas to the metadata block, write 420 the remaining one or more reference count deltas back to the one or more delta container pages (e.g., set of delta container pages 510, 512, 514). In this manner, reference count update process 10 may utilize the one or more delta container pages as an "extension" to the metadata block.

In some implementations, reference count update process 10 may aggregate the remaining one or more reference count deltas and commit them altogether, in an amortized manner, as discussed above. In some implementations, reference count update process 10 may generate one or more compressed reference count deltas representing multiple reference counts, either to the same metadata block and/or different metadata blocks with similar properties (e.g., similar addresses based on common bits, etc.). As will be discussed in greater detail below, when performing an operating that requires a consistent reference count associated with a metadata block, reference count update process 10 may identify any remaining reference count deltas written 420 back to the one or more delta container pages and may update the metadata block with the remaining reference count deltas.

In some implementations, when reference count update process 10 determines that writing each of the one or more reference count deltas to the metadata block will not exceed a maximum reference count associated with the metadata block, reference count update process 10 may write each of the one or more reference count deltas to the metadata block as described above.

In some implementations, reference count update process 10 may update 422, via at least one node, the reference count associated with the metadata block based upon, at least in part, the one or more reference count deltas associated with the metadata block stored in the cache memory system of the at least one node. In some implementations, reference count update process 10 may receive a request to perform an operation on a metadata block (e.g., an operation that requires a consistent reference count associated with the metadata block, an operation that does not require a consistent reference count associated with the metadata block, etc.). As discussed above, an exclusive lock or a shared-lock may be provided to a node when performing an operation on a metadata block. In some implementations, before performing the operation, reference count update process 10 may update 422 the reference count associated with the metadata block based upon, at least in part, the one or more reference count deltas associated with the metadata block stored in the cache memory system of the at least one node.

In some implementations, updating 422, via the at least one node, the reference count associated with the metadata block based upon, at least in part, the one or more reference count deltas associated with the metadata block stored in the cache memory system of the at least one node may include caching 424 a copy of the metadata block from a storage array to the cache memory system of the at least one node. For example, suppose that reference count update process 10 receives a request from a node (e.g., storage processor 100) to perform an operation on a metadata block (e.g., metadata block 136). In this example, reference count update process 10 may cache 424 a copy of the metadata block (e.g., metadata block 136) from the storage array to the cache memory system of the node (e.g., cache memory system 122). In this example, reference count update process 10 may cache 424 a copy of metadata block 136 (e.g., metadata block 138) into cache memory system 122.

In some implementations, updating, via the at least one node, the reference count associated with the metadata block based upon, at least in part, the one or more reference count deltas associated with the metadata block stored in the cache memory system of the at least one node may include applying 426 the one or more reference count deltas associated with the metadata block stored in the cache memory system of the at least one node to the cached copy of the metadata block. In some implementations, applying the one or more reference count deltas associated with the metadata block may generally include modifying the cached copy of the metadata block with the one or more updates defined by the one or more reference count deltas.

For example, reference count update process 10 may identify a data container from the one or more data containers in the volatile memory that is associated with the metadata block. In some implementations, reference count update process 10 may identify one or more reference count deltas from the identified data container. For example, reference count update process 10 may search one or more bloom filters associated with the one or more data containers (e.g., one or more data containers 504, 506) to identify one or more reference count deltas from the identified data container(s). If the bloom filter indicates that the data container contains one or more reference count deltas for the metadata block, reference count update process 10 may add the one or more reference count deltas from the one or more data containers to an "unmerged reference count change set".

In some implementations, reference count update process 10 may also search the one or more delta container pages stored in the storage array. In a manner similar to identifying the data container from the one or more data containers in the volatile memory that is associated with the metadata block, reference count update process 10 may identify a delta container page from the one or more sets of delta container pages stored in the storage array. For example, reference count update process 10 may search the bloom filters associated with each set of delta container pages (e.g., sets of delta container pages 514, 516, 518) to identify one or more reference count deltas from the identified delta container page(s). Similarly, if the bloom filter indicates that the delta container page(s) contain one or more reference count deltas for the metadata block, reference count update process 10 may add the one or more reference count deltas from the set of delta container pages to the "unmerged reference count change set".

As discussed above and in some implementations, reference count update process 10 may cache 424 the metadata block from the storage array. In some implementations, reference count update process 10 may merge the one or more identified reference count deltas with the metadata block read from the storage array, thus defining a current metadata block. For example, reference count update process 10 may merge the "unmerged reference count change set" with the metadata block cached from the storage array to define a current metadata block.

Referring again to FIGS. 2 and 5 and continuing with the above example, reference count update process 10 may apply 426 one or more reference count deltas associated with a metadata block stored in the cache memory system of the at least one node to the cached copy of the metadata block. In this example, reference count update process 10 may apply 426 one or more reference count deltas stored in the cache memory system (e.g., cache memory system 122) to the cached copy of the metadata block (e.g., metadata block 138).

In some implementations, reference count update process 10 may determine that applying each of the one or more reference count deltas associated with the metadata block stored in the cache memory system of the at least one node to the cached copy of the metadata block will exceed a maximum reference count associated with the cached copy of the metadata block. As discussed above and in some implementations, a metadata block may have a predefined maximum reference count (i.e., a maximum number of first layer metadata blocks referencing the second layer metadata block). In some implementations, reference count update process 10 may determine that applying the one or more reference count deltas to a particular metadata block will exceed the maximum reference count associated with the metadata block.

In some implementations, reference count update process 10 may write 428 at least a subset of the one or more reference count deltas to the cached copy of the metadata block based upon, at least in part, the maximum reference count associated with the cached copy of the metadata block. In some implementations, reference count update process 10 may determine how many reference count deltas may be written 428 to the cached copy of the metadata block. In this manner, reference count update process 10 may determine at least a subset of the one or more reference count deltas to write 428 to the cached copy of the metadata block.

In some implementations, when reference count update process 10 determines that applying each of the one or more reference count deltas associated with the metadata block stored in the cache memory system of the at least one node to the cached copy of the metadata block will exceed a maximum reference count associated with the cached copy of the metadata block, reference count update process 10 may provide an indication that not all reference count deltas have been applied to the cached copy of the metadata block.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
   receiving, at a node of a multi-node storage system, one or more updates to a reference count associated with a metadata block;
   storing one or more reference count deltas associated with the metadata block in a cache memory system of the node;
   retaining, in a cache memory system of each other node of the multi-node storage system, an existing copy of the metadata blocks;
   writing the one or more reference count deltas associated with the metadata block to one or more delta container pages of the storage array;
   determining that writing each of the one or more reference count deltas to the metadata block will exceed a maximum reference count associated with the metadata block;
   writing a first portion of the one or more reference count deltas to the metadata block in the storage array based upon, at least in part, the maximum reference count associated with the metadata block; and
   writing the remaining one or more reference count deltas back to the one or more delta container pages of the storage array.

2. The computer-implemented method of claim 1, further comprising:
   receiving, from a node of the multi-node storage system, a request to perform an operation on the metadata block that requires a consistent reference count associated with the metadata block, thus defining a requesting node; and
   providing an exclusive lock on the metadata block to the requesting node.

3. The computer-implemented method of claim 1, further comprising:
   receiving, from at least one node, a request to perform an operation on the metadata block that does not require a consistent reference count associated with the metadata block; and
   providing a shared lock on the metadata block to the at least one node of the multi-node storage system.

4. The computer-implemented method of claim 1, further comprising:
   updating, via at least one node, the reference count associated with the metadata block based upon, at least in part, the one or more reference count deltas associated with the metadata block stored in the cache memory system of the at least one node.

5. The computer-implemented method of claim 4, wherein updating, via the at least one node, the reference count associated with the metadata block based upon, at least in part, the one or more reference count deltas associated with the metadata block stored in the cache memory system of the at least one node includes:
   caching a copy of the metadata block from a storage array to the cache memory system of the at least one node; and
   applying the one or more reference count deltas associated with the metadata block stored in the cache memory system of the at least one node to the cached copy of the metadata block.

6. The computer-implemented method of claim 5, further comprising:
writing at least a subset of the one or more reference count deltas to the cached copy of the metadata block based upon, at least in part, a maximum reference count associated with the cached copy of the metadata block.

7. A computer program product residing on a non-transitory computer readable medium having a plurality of instructions stored thereon which, when executed by a processor, cause the processor to perform operations comprising:
receiving, at a node of a multi-node storage system, one or more updates to a reference count associated with a metadata block;
storing one or more reference count deltas associated with the metadata block in a cache memory system of the node;
retaining, in a cache memory system of each other node of the multi-node storage system, an existing copy of the metadata blocks;
updating, via at least one node, the reference count associated with the metadata block based upon, at least in part, the one or more reference count deltas associated with the metadata block stored in the cache memory system of the at least one node, wherein updating, via the at least one node, the reference count associated with the metadata block based upon, at least in part, the one or more reference count deltas associated with the metadata block stored in the cache memory system of the at least one node includes:
caching a copy of the metadata block from a storage array to the cache memory system of the at least one node, and
applying the one or more reference count deltas associated with the metadata block stored in the cache memory system of the at least one node to the cached copy of the metadata block; and
writing at least a subset of the one or more reference count deltas to the cached copy of the metadata block based upon, at least in part, a maximum reference count associated with the cached copy of the metadata block.

8. The computer program product of claim 7, wherein the operations further comprise:
receiving, from a node of the multi-node storage system, a request to perform an operation on the metadata block that requires a consistent reference count associated with the metadata block, thus defining a requesting node; and
providing an exclusive lock on the metadata block to the requesting node.

9. The computer program product of claim 7, wherein the operations further comprise:
receiving, from at least one node, a request to perform an operation on the metadata block that does not require a consistent reference count associated with the metadata block; and
providing a shared lock on the metadata block to the at least one node of the multi-node storage system.

10. The computer program product of claim 7, wherein the operations further comprise:
writing the one or more reference count deltas associated with the metadata block to one or more delta container pages of the storage array;
determining that writing each of the one or more reference count deltas to the metadata block will exceed a maximum reference count associated with the metadata block;
writing a first portion of the one or more reference count deltas to the metadata block in the storage array based upon, at least in part, the maximum reference count associated with the metadata block; and
writing the remaining one or more reference count deltas back to the one or more delta container pages of the storage array.

11. A computing system comprising:
a memory; and
a processor configured to receive, at a node of a multi-node storage system, one or more updates to a reference count associated with a metadata block, wherein the processor is further configured to store one or more reference count deltas associated with the metadata block in a cache memory system of the node, wherein the processor is further configured to retain, in a cache memory system of each other node of the multi-node storage system, an existing copy of the metadata block, wherein the processor is further configured to write the one or more reference count deltas associated with the metadata block to one or more delta container pages of the storage array, wherein the processor is further configured to determine that writing each of the one or more reference count deltas to the metadata block will exceed a maximum reference count associated with the metadata block, wherein the processor is further configured to write a first portion of the one or more reference count deltas to the metadata block in the storage array based upon, at least in part, the maximum reference count associated with the metadata block, and wherein the processor is further configured to write the remaining one or more reference count deltas back to the one or more delta container pages of the storage array.

12. The computing system of claim 11, wherein the processor is further configured to:
receive, from a node of the multi-node storage system, a request to perform an operation on the metadata block that requires a consistent reference count associated with the metadata block, thus defining a requesting node; and
provide an exclusive lock on the metadata block to the requesting node.

13. The computing system of claim 11, wherein the processor is further configured to:
receive, from at least one node, a request to perform an operation on the metadata block that does not require a consistent reference count associated with the metadata block; and
provide a shared lock on the metadata block to the at least one node of the multi-node storage system.

14. The computing system of claim 11, wherein the processor is further configured to:
update, via at least one node, the reference count associated with the metadata block based upon, at least in part, the one or more reference count deltas associated with the metadata block stored in the cache memory system of the at least one node.

15. The computing system of claim 14, wherein updating, via the at least one node, the reference count associated with the metadata block based upon, at least in part, the one or more reference count deltas associated with the metadata block stored in the cache memory system of the at least one node includes:
caching a copy of the metadata block from a storage array to the cache memory system of the at least one node; and applying the one or more reference count deltas associated with the metadata block stored in the cache memory system of the at least one node to the cached copy of the metadata block.

\* \* \* \* \*